(12) United States Patent
Hattori

(10) Patent No.: US 11,920,622 B2
(45) Date of Patent: Mar. 5, 2024

(54) CLIP

(71) Applicant: NIFCO INC., Yokosuka (JP)

(72) Inventor: Kenji Hattori, Yokosuka (JP)

(73) Assignee: NIFCO INC., Yokosuka (JP)

( * ) Notice: Subject to any disclaimer, the term of this patent is extended or adjusted under 35 U.S.C. 154(b) by 395 days.

(21) Appl. No.: 17/268,846

(22) PCT Filed: Aug. 21, 2019

(86) PCT No.: PCT/JP2019/032561
§ 371 (c)(1),
(2) Date: Feb. 16, 2021

(87) PCT Pub. No.: WO2020/040173
PCT Pub. Date: Feb. 27, 2020

(65) Prior Publication Data
US 2021/0190115 A1    Jun. 24, 2021

(30) Foreign Application Priority Data
Aug. 22, 2018  (JP) .................................. 2018-155270

(51) Int. Cl.
*F16B 19/10* (2006.01)
*F16B 5/06* (2006.01)

(52) U.S. Cl.
CPC ...... *F16B 19/10* (2013.01); *F16B 2005/0671* (2013.01)

(58) Field of Classification Search
CPC .............. F16B 19/10; F16B 2005/0671; F16B 19/1081; F16B 13/126; F16B 21/02
(Continued)

(56) References Cited

U.S. PATENT DOCUMENTS 4,136,599 A * 1/1979 Hammer, Jr. ......... F16B 13/126
411/16
5,370,484 A * 12/1994 Morikawa ........... F16B 19/1081
411/48
(Continued)

FOREIGN PATENT DOCUMENTS

CN      101634327 A    1/2010
CN      102395802 A    3/2012
(Continued)

OTHER PUBLICATIONS

PCT/ISA/210, "International Search Report for International Application No. PCT/JP2019/032561," dated Oct. 29, 2019.
(Continued)

*Primary Examiner* — Victor D Batson
*Assistant Examiner* — Dil K. Magar
(74) *Attorney, Agent, or Firm* — Manabu Kanesaka

(57) ABSTRACT

The clip includes a head part, a shaft part, a pin having first and second engaged parts at the shaft part, and a grommet having a flange part with an insertion hole, a leg part, and an engaging part engaging with/disengaging from the engaged part. The pin has the engaging part near the inner periphery of the insertion hole of the flange part. The pin has guide grooves between the first and second engaged parts to guide the movement of the pin while movably engaging the engaging part. Switching between a temporary fixing state and a permanent fixing state is conducted through movement of the shaft part associated with guiding by the guide grooves. When the pin in the permanent fixing state is rotated and moved in the pull-up direction associated with guiding by the guide grooves, engagement between the engaging part and the second engaged part is released.

9 Claims, 11 Drawing Sheets

(58) Field of Classification Search
USPC .................................................... 411/45–48
See application file for complete search history.

(56) References Cited

U.S. PATENT DOCUMENTS

| | | | | |
|---|---|---|---|---|
| 7,207,759 | B2* | 4/2007 | Kato | F16B 19/1081 411/509 |
| 7,237,995 | B2* | 7/2007 | Randez Perez | F16B 19/1081 411/48 |
| 7,736,107 | B2* | 6/2010 | Okada | F16B 19/1081 411/41 |
| 8,662,807 | B2* | 3/2014 | Adachi | B60R 13/0206 411/49 |
| 8,794,887 | B2 | 8/2014 | Nishino | |
| 9,181,968 | B2 | 11/2015 | Handa et al. | |
| 2003/0143053 | A1* | 7/2003 | Kanie | F16B 5/0642 411/45 |
| 2004/0175250 | A1* | 9/2004 | Yoneoka | F16B 19/1081 411/45 |
| 2005/0169726 | A1* | 8/2005 | McClure | F16B 37/043 411/55 |
| 2012/0174354 | A1* | 7/2012 | Sato | F16B 19/1081 24/595.1 |
| 2013/0039717 | A1* | 2/2013 | Sasaki | F16B 19/1081 411/80.1 |
| 2013/0136559 | A1* | 5/2013 | Hauser | F16B 5/065 411/45 |
| 2013/0145585 | A1* | 6/2013 | Watanabe | F16B 19/008 24/595.1 |
| 2013/0287517 | A1* | 10/2013 | Fujiwara | F16B 19/1081 411/54.1 |
| 2016/0223003 | A1* | 8/2016 | Miura | F16B 19/1081 |

FOREIGN PATENT DOCUMENTS

| | | | | |
|---|---|---|---|---|
| CN | 102395802 A | * | 3/2012 | ......... B60R 13/0206 |
| CN | 105556139 A | | 5/2016 | |
| JP | H06-40428 A | | 2/1994 | |
| JP | H106-40428 U | | 5/1994 | |
| JP | 2002-106531 A | | 4/2002 | |
| JP | 2002106531 A | * | 4/2002 | |
| JP | 2007056895 A | * | 3/2007 | |
| JP | 2009-41673 A | | 2/2009 | |
| JP | 2010-249198 A | | 11/2010 | |
| JP | 2012082955 A | * | 4/2012 | ......... F16B 19/1081 |
| JP | 2012246963 A | * | 12/2012 | ......... F16B 19/1081 |
| JP | 2013160296 A | * | 8/2013 | |
| JP | 2013238286 A | * | 11/2013 | |
| JP | 5627940 B2 | | 11/2014 | |
| JP | 2016215689 A | * | 12/2016 | ............ B60R 21/20 |
| JP | 2017096449 A | * | 6/2017 | |
| WO | 2016/043151 A1 | | 3/2016 | |

OTHER PUBLICATIONS

China National Intellectual Property Administration, "Office Action for Chinese Patent Application 201980055734.0," dated Feb. 17, 2022.

China National Intellectual Property Administration, Search Report for Chinese Patent Application 201980055734.0, dated Feb. 9, 2022.

* cited by examiner

CLIP

TECHNICAL FIELD

The present invention relates to a clip.

BACKGROUND

FIG. 11(a) shows a clip (push-rivet) disclosed in Patent Document 1, and FIG. 11(b) shows a clip (grommet) in Patent Document 2. Each clip comprises a pin including a head portion and a shaft portion provided under the head portion, and first engaged portions and second engaged portions both being formed on the shaft portion, and a grommet having a flange with an insertion hole, and a leg portion provided to project under the flange and engaging portions engaging with and disengaging from the respective engaged portions.

Hereunder, both Patent Documents will be explained in detail. As an important part of the Patent Document 1, the grommet 1 includes engaging portions (engaging projections) 19 provided at inner faces of the ends of leg portions 14, and a pin insertion depression 12 provided on an upper surface of a flange portion 11. A pin 2 includes first engaged portions (engaging depressions) 26 for temporary fixing, engaging the engaging portions 19 during insertion into the leg portions 14 of a shaft portion 22, and second engaged portions (engaging projections) 27 for permanent fixing, engaging the engaging portions 19 by inserting the shaft portion 22 further inside the shaft portion 22 from the temporary fixing condition where the engaging portions 19 are temporary fixed with the first engaged portions. The grommet 1 and the pin 2 include a tool insertion space 3 between a head portion 21 and the flange portion 11 used when the head portion 21 is inserted into the pin insertion depression 12. And, the clip is changed from the temporary fixing condition where relative to the grommet 1, the engaging portions 19 engage the first engaged portions 26, to the using condition where the leg portions 14 elastically open to the shaft outer diameter by inserting the pin 22 into the leg portion, and becomes the permanent fixing condition where the leg portions 14 are kept in the using condition by engaging the engaging portions 19 with the second engaged portion 27.

Also, as an important part of the Patent Document 2, a grommet (main body) 2 includes projections provided at a top inner faces of a leg portion 21, i.e. divided leg pieces 214, a first abutment portion provided at a part of the leg pieces 214 and second abutment portions provided at the rest of the leg pieces 214 among the plurality of leg pieces 214, and engaging portions (fixed portions) provided at an inner side of the hole of the flange portion (head portion). A pin (shaft portion) 1 includes first engaged portions (fixing portions) for temporary fixing, engaging the engaging portions during insertion of the shaft portion (main body portion) into the leg portion 21, and second engaged portions (additional fixing portions) for permanent fixing, engaging the engaging portions by inserting the shaft portion from the temporary fixing condition where the engaging portions engage the first engaged portions to further into the leg portion. The clip becomes the temporary fixing condition where the first engaged portions engage the engaging portions at an initial condition where the shaft portion (main portion) is inserted into the leg portion 21, and by further inserting the shaft portion, parts of the leg pieces 214 elastically open by the first abutment portions press-contacting the projections, and then, the rest of the leg pieces 214 elastically opens by the second abutment portions elastically contacting the projections. By further inserting the shaft portion, the engaging portions engage the second engaged portions to become the permanent fixing condition where the leg portions 21 are kept in the use condition.

PRIOR ART DOCUMENT

Patent Document

Patent Document 1: Japanese Utility Model Publication No. H6-40428
Patent Document 2: Japanese Patent No. 5627940

SUMMARY OF THE INVENTION

Problem to be Solved by the Invention

In the above clips, for example, in a use condition where a plate on a main body side, such as a panel, is fixed to a plate on an attachment side, such as a cover, it is necessary to remove the plate on the attachment side for repair or replace of a part on the main body side, so that the permanent fixing condition is sometimes changed again to the temporary engaging condition. In that case, in the clip of the Patent Document 1, when a removing operation by a tool 8 inserting into the space 3 of the pin 2 in the permanent engaging portion, i.e. the tool 8 inserting into the space 3, is moved, the pin 2 is slightly pulled so that the engaging portions 19 are released from the engagement. Thereafter, when the pin 2 is pulled by using the head portion 21, it returns to the temporary fixing condition where the engaging portions 19 engage the first engaged portions 2. In the Patent Document 2, there is no explanation as to the change from the permanent fixing condition again to the temporary fixing condition, as in the Patent Document 1, generally, when a tool, such as a driver, is moved down in a condition where the tool is forcibly inserted between a concave bottom of the flange portion 20 and the head portion 13, the pin 1 is slightly pulled out, so that the engaging portions 20b are engage-released from the second engaged portion 27. Thereafter, upon the pin pulling out operation by using the head portion 13, it returns to the temporary fixing condition where the engaging portions 20b engage the first engaged portions 14.

However, in the above operation changing from the permanent fixing condition to the temporary fixing condition, an end of the tool, such as a driver, is inserted into the lower side of the head portion, and the end of the tool, as a fulcrum, must be inclined or the head portion must be pulled out. Thus, the operation efficiency is not good and troublesome. In this respect, in case of using many clips and an operation space is limited, this causes a big problem. Also, in the clip of the Patent Document 1, since the engaging portions are formed at the ends of the leg portions, the leg enlargement amount in the elastic opening state of the legs at the pin inserting time inserting the pin into the legs cannot be made large, and tolerance relative to the opening diameter for the attachment hole and the plate thickness is small.

In view of the above background, an object of the invention is to enlarge tolerance relative to the opening diameter for the attachment hole and the plate thickness in case of, for example, fixing a main body side plate to an attachment side plate or fixing plates each other, and to securely and effectively change the permanent fixing condition where the leg portions are opened by inserting the pin into the grommet to the temporary fixing condition. Other objects will be apparent in the following descriptions.

Means for Solving the Problems

In order to attain the above objects, the clip of the present invention comprises a pin including a head portion and a shaft portion provided under the head portion, a first engaged portion and a second engaged portion both being provided on the shaft portion; and a grommet having a flange with an insertion hole, a leg portion projecting from a lower surface of the flange and an engaging portion engaging with and disengaging from the respective engaged portions, the clip changing a temporary fixing condition where the engaging portion engages the first engaged portion in a course of arranging the pin to the grommet such that the shaft portion is inserted into the leg portion through the insertion hole, to a permanent fixing condition where the engaging portion is engaged with the second engaged portion after the leg portion is elastically enlarged by further insertion of the shaft portion, wherein the grommet include the engaging portion around an inner periphery of the insertion hole of the flange, the pin includes a guide groove formed between the first engaged portion of the shaft portion and the second engaged portion and guiding movement of the pin in a condition of slidably engaging the engaging portion, and the temporary fixing condition and the permanent fixing condition are changed by the movement of the shaft along guiding of the guide groove, and by an upward movement of the pin from the permanent fixing condition along with the rotation of the pin and guiding of the guide groove, the engaging portion is able to engage the first engaged portion by releasing engagement of the engaging portion with the second engaged portion.

The clip of the invention is used in a case where a plate portion of an attachment side portion is fixed to a plate portion, such as a panel and so on, on a main body side, or fixing the plates in a condition piled together. The plates may be three or more plates. Also, in the permanent fixing condition, the engaging portion of the grommet is engaged with the second engaged portion of the pin, wherein the leg portion of the grommet is enlarged and is kept in the enlarged state. In the temporary fixing condition, the first engaged portion of the pin is not accidentally separated from the engaging portion of the grommet, and the leg portion of the grommet is reduced as in the case the grommet is molded. Namely, the pin and grommet are temporary fixed after molding in order not to be easily separated from each other, and are designed to be inserted into the attachment holes for the plates and removed therefrom as an assembly.

The above invention may be embodied as explained below.

(A) The guide groove includes a linear groove portion extending along an axial direction of the shaft portion, and a curved groove portion continuous to an upper groove portion of the linear groove portion. In this configuration, for example, it is possible to change from the temporary fixing condition to the permanent fixing condition by the pin moving linearly along the linear groove portion in a condition that the pin engages the engaging portion, and when the pin is rotated for a predetermined angle in the permanent fixing condition, after the second engaged portion is engage-released, it is possible to move the pin for the predetermined distance in the pulling up direction.

(B) The second engaged portion is connected to the curved groove portion, and by rotating the pin in a condition of engaging with the engaging portion, the engaging portion moves to a curved groove side to be able to release engagement. In this configuration, by only rotating the pin for the predetermined angle in the permanent fixing condition, the engagement of the second engaged portion relative to the engaging portion is securely released.

(C) The first engaged portion and the second engaged portion are formed to correspond to two ends of the guide groove in a longitudinal direction. In this configuration, since the first engaged portion and the second engaged portion are formed at the two ends corresponding to the two ends of the linear groove portion, by forming the first engaged portion with respect to the linear groove portion only with a space or the second engaged portion with respect to the linear groove portion only with a projection, the temporary fixing condition can be made by inserting the pin to the grommet or the click feeling can be provided when changing from the temporary fixing condition to the permanent fixing condition, to thereby improve using convenience.

(D) The first engaged portion is formed to a concave portion provided at a lower end of the linear groove portion or at the lower end with a space therebetween. In this configuration, when the first engaged portion is the concave portion, for example provided at the linear groove portion with a space, or at the lower end of the linear groove portion, it is sufficient to form the depth shallow before the concaved portion. Then, the above click feeling can be easily provided.

(E) The second engaged portion includes a projection located on an extension line of the linear groove portion and connecting with the curved groove portion, and is able to engage with the engaging portion by the engaging portion riding over the projection from the linear groove portion side by inserting the pin. In this configuration, for example, it is possible to easily form by only adding the projection to the second engaged portion, and to judge the change to the permanent fixing condition by the above click feeling.

(F) When the pin is rotated to the grommet for a predetermined angle (for example, 30 degrees) by removing operation from the permanent fixing condition of the pin, the engagement of the engaging portion with the second engaged portion is released, and when the pin is further rotated for a predetermined angle (for example 60 degrees) in a peripheral direction, the pin is pulled up for a predetermined length. In this configuration, when the pin is rotationally operated in the permanent fixing condition, the engagement of the engaging portion with the second engaged portion is released to be further pulled, and thereafter, by pulling up the pin with pinching the head portion, it is possible to change again to the temporary fixing condition. Incidentally, as a tool to rotate the pin, it is considered that as in an embodiment, a rotation operation is made by forming the head portion to have an insertion groove in a head portion and inserting a tool, such as a driver, to the insertion groove, or the head portion is formed to have a thickness such that a part of the head portion projects from the concave portion in a permanent fixing condition, and the projected portion is rotated in the condition that the projected portion is engaged with a special tool.

Advantages of the Invention

In the clip of the invention, in case of changing the clip or the pin from the permanent fixing condition to the temporary fixing condition, by only rotation operation of the pin for the predetermined angel, the second engaged portion is engage-released from the engaging portion, so that the pin is pulled up for the predetermined length along with the guiding operation of the guide groove. Thus, it is possible to quickly and securely change even in a narrow place or a place where the pin can not be seen. Also, in the conventional clip, since the leg portion returns to the original condition when the permanent fixing condition comes close to the temporary fixing condition, the pin is apt to rotate relative to the attachment hole. However, in the present invention, when the pin is rotated for the predetermined angel (in the embodiment, 90 degrees), the pin is pulled out above the flange up to the predetermined length, i.e. to the length enable to grip the head portion. Thus, it is not affected by the rotation relative to the attachment hole, and the invention is superior in this respect.

Also, in the clip of the invention, as compared with the clip in the Patent Document 1, the engaging portion at the grommet side engaging with and disengaging from the respective engaged portions of the pin is not formed on the leg portion, and is formed at the inner periphery of the insertion hole of the flange, and when the pin is all the way inserted to the end, the enlarged diameter or expansion amount of the leg is made larger. Thus, tolerance relative to the plate thickness of the plate and the hole diameter of the attachment hole is made relatively great.

BRIEF DESCRIPTION OF THE DRAWINGS

FIGS. 2(a) and 2(b) show a pin temporary fixing condition relative to a grommet as the above clip, wherein FIG. 2(a) is a plan view, and FIG. 2(b) is a front view (seen from a Z direction of FIG. 7(a)).

FIGS. 3(a) and 3(b) show a pin permanent fixing condition relative to the grommet as the above clip, wherein FIG. 3(a) is a front view, and FIG. 3(b) is an explanatory vertical sectional view of FIG. 3(a).

FIGS. 5(a) to 5(d) show the single pin, wherein FIG. 5(a) is a plan view, FIG. 5(b) is a front view, FIG. 5(c) is a bottom view, and FIG. 5(d) is a right side view.

FIGS. 7(a) to 7(d) show the single grommet, wherein FIG. 7(a) is plan view, FIG. 7(b) is a front view, FIG. 7(c) is a bottom view, and FIG. 7(d) is a view seen from a Z-direction in FIG. 7(a).

FIG. 9(b) is an explanatory view showing a middle of insertion of the pin, and FIG. 9(c) is an explanatory view of a pin permanent fixing condition relative to the grommet.

FIGS. 10(a) to 10(c) show an operation 2 of the clip, wherein FIG. 10(a) is an explanatory view showing a middle of release of engagement of the pin from the pin permanent fixing condition, FIG. 10(b) is an explanatory view showing completion of the release of engagement of the engaging portions, and FIG. 10(c) is an explanatory view showing a condition returning to the pin temporary fixing condition.

EMBODIMENTS OF THE INVENTION

Figure 1:
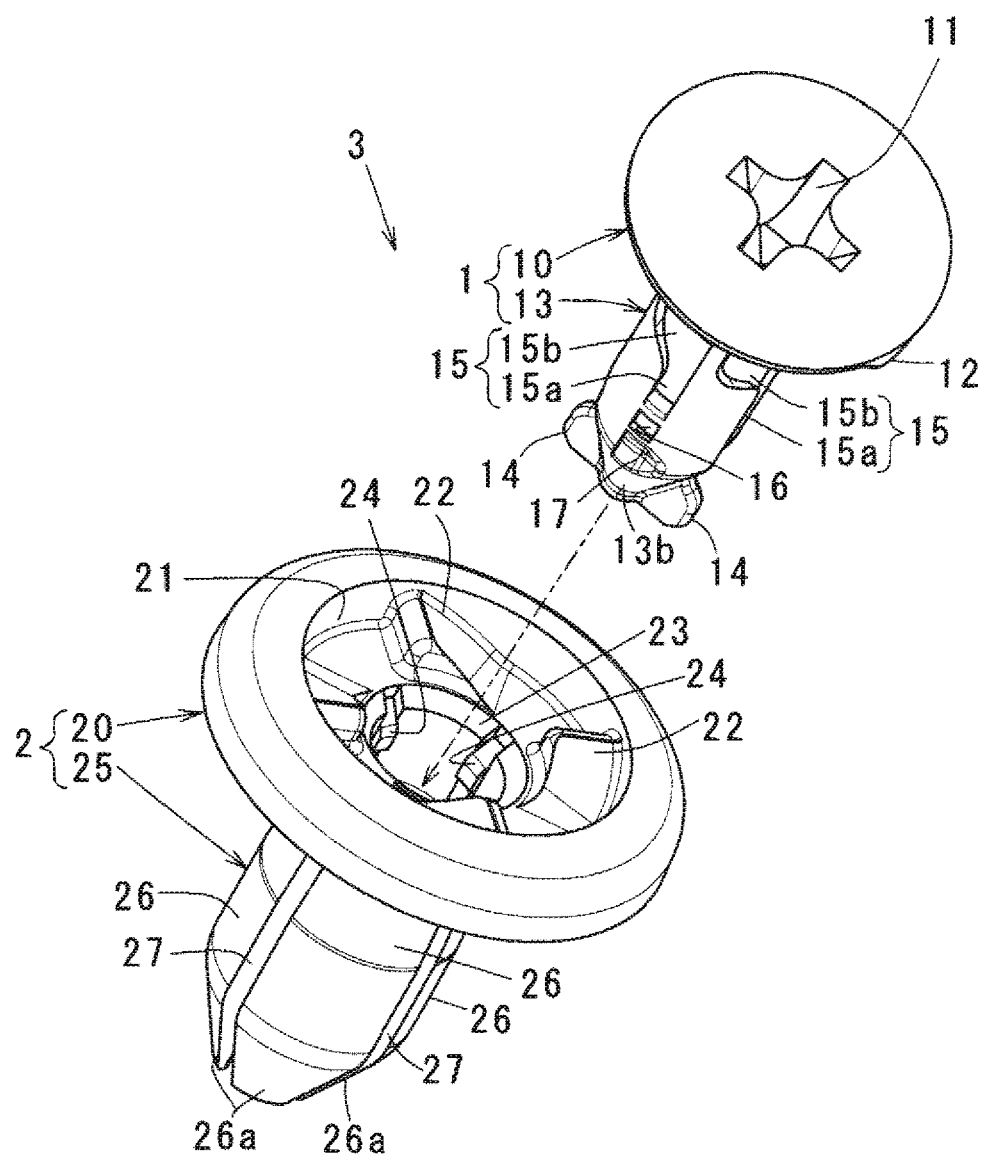
FIG. 1 is an outer configuration of a clip of the invention showing a condition separated to a pin and a grommet.

Hereinafter, the configuration of the clip of the invention is explained with reference to the drawings. In the explanation, after explaining the structure of the clip in detail, the main operation is clarified. Incidentally, the size of the clip is arbitrary, but the drawings are enlarged to easily understand in the drawings. Also, in FIGS. 9(b), 9(c) and 10(a), 10(b), portions of the enlarged portions and so on of the legs are simplified for limitation on the drawings.

(Structure) A clip 3 of the embodiment comprises a pin 1 including a head portion 10, a shaft portion 13 formed under the head portion, first engaged portions 16 and second engaged portions 19, both being formed on the shaft portion 13, and a grommet including a flange 20 with an insertion hole 23, a leg portion 25 with, generally, a cylindrical shape projecting from a lower surface of the flange 20, and engaging portions 24 engaging with and disengaging from the engaged portions 16, 19. The clip 3 is the same as the conventional one in the point that the clip 3 can be changed to a temporary fixing condition where the engaging portions 24 engage the first engaged portions in the middle of inserting the pin 1 to the grommet 2 while the shaft portion 13 enters the leg portion 25 through the insertion hole 23, and a permanent fixing condition where the engaging portions 24 engage the second engaged portions 19 after further inserting the pin to the leg portion 25 to elastically enlarge the leg portions 25. The inventive point resides in the structure of the engaging portions 24 formed in the grommet 2, and guide grooves 15 formed on the shaft portion 13 and guiding a linear movement of the pin 1 in a condition of slidably engaging with the engaging portions 24. Hereinafter, the detailed structure is made clear.

First, the pin 1 is an injection molded product made of resin, and as shown in FIG. 1 to FIG. 5(d), the head portion 10 has, generally, a disc shape, and the shaft portion 13 projects generally in a columnar form through a large diameter portion 13a from the center of the lower surface of the head portion. The head portion 10 includes an insertion groove 11 in a cross shape formed in the upper center thereof, and a pair of cam projections 12 formed underneath at a lower peripheral side. The insertion groove 11 is rotated in a condition that a tool, such as a driver, is engaged, so that the pin 1 permanently fixed to the grommet 2 to a desired angle. As shown in FIGS. 5(b) and 5(c), the cam projections 12 are arranged to face each other with the shaft portion 13 therebetween. Each projection 12 is formed such that one of two vertical faces arranged in the peripheral direction is formed vertically, and the other face is formed to an inclined face from the lower side of the vertical face to an inclined face in an obliquely upper direction. The large diameter portion 13a is formed to be slightly larger than the shaft portion 13, and is connected to the shaft portion 13 through a tapered portion. Incidentally, the large diameter portion 13a and the tapered portion may be recognized as a part of the head portion 10, not a part of the shaft portion 13.

The shaft portion 13 becomes an included face 13b formed such that as it goes to an end in the columnar shaft, the diameter becomes gradually small. Also, the shaft portion 13 includes a pair of wings 14 provided at the end side of the inclined face 13b, guide grooves 15 guiding the linear movement of the pin 1 in a condition engaging with the engaging portions 24, first engaged portions 16 temporary fixing the pin 1 in a condition of engaging with the engaging portions 24 with respect to the grommet 2, step portions 17 formed to keep with a slight space with respect to the first engaged portions 16 as shown in FIG. 5(*b*) and the guide grooves 15 as shown in FIG. 5(*d*), second engaged portions 19 engaging the pin 1 permanently in a condition of engaging with the engaging portions 24 with respect to the grommet 2, and projections 18 provided between the guide 15 and the second engaged portions 19.

In this structure, the pair of wings 14 has a thickness slidably engaging the slit 27 dividing a leg portion 25 explained later to a plurality of leg pieces 26. And, each wing 14 is designed to see a relative position of the pin 1 to the grommet 2 in an assembling operation of the pin 1 to the grommet 2, and to guide in a condition of engaging with the slit 27 until it comes to the temporary fixing condition by inserting the pin 1 to the grommet 2. Also, each wing 14 is formed to have an inclined portion at upper and lower corners. This is made not to receive resistance when inserting the pin 1 from the insertion hole 23 of the grommet 2 to the leg portion 25, and on the contrary when removing from the grommet 2. Incidentally, the wing 14 of itself may be eliminated.

The guide grooves 15, the step portions 17, the projections 18 and the second engaged portions 19 are located around the shaft portion 13, and provided at four portions located on the same axial line and equally divided on the periphery. Here, the guide groove 15 includes a linear groove portion 15*a* extending in the axial direction formed between the first engaged portion 16 and the second engaged portion 19, and a curved groove portion 15*b* in a curved shape formed next to the linear groove portion 15*a*. The linear groove portion 15*a* has a groove width such that the grommet side engaging portion 24 can relatively freely engage, explained later. Also, among the four linear groove portions 15*a*, a pair of linear groove portions 15*a*, 15*a* facing each other as shown in FIG. 5(*b*), and another pair of linear groove portions 15*a*, 15*a* facing each other as shown in FIG. 5(*d*) are different at the following points.

Namely, the linear groove portions 15*a*, 15*a* as shown in FIG. 5(*b*) are shorter than the linear groove portion 15*a* as shown in FIG. 5(*d*), and must require depressions which are the first engaged portions 16 formed on the same axial line with a slight space therebetween. Also, the lower end side of the linear groove portion 15*a* is formed to be an inclined portion 15*c* which is formed higher as it goes to the lower end. In the structure, the engaging portion 24 moves relatively along the linear groove portion 15*a*, as explained later, and after riding over from the inclined portion 15*c* to the shaft peripheral surface with an elastic deformation, when detachably engaging the depression which is the engaged portion 16, it provides a click feeling. In the click feeling, an operator notices that it is changed to the temporary fixing condition. Incidentally, the linear groove portion 15*a* in FIG. 5(*d*) has the height same as the depression where the groove end is the first engaged portion 16, namely the distance from the axial end is the same position. Also, the first engaging portion 16 may be, for example a linear groove portion 15*a* as shown in FIG. 5(*d*) and have a slightly higher step portion before the groove lower end corresponding to the depression. In this structure, when the engaging portion rides over the step portion, it also provides the click feeling as well.

The curved groove portion 15*b* is provided to extend from an upper side groove portion of the linear groove portion 15*a*, and as a width size of the linear groove portion 15*a*, as compared with the lower side groove width, the upper side groove width of the linear groove portion is made wide corresponding to the groove width of the curve groove portion. In this structure, when the pin 1 in the permanent fixing condition where the pin 1 engages the engaging portion 24 at the second engaged portions 19 as shown in FIG. 9(*c*) is rotated for a predetermined angle (for example, about 30 degrees) in the counter-clockwise direction as shown in FIG. 10(*a*), the second engaged portion (projection) disengages from the engaging portion, and the engaging portion 24 is located in the groove width widened in the curved groove portion 15*b* to be able to become disengagement. When the pin is further rotated for a predetermined angle (for example, about 90 degrees) in the counter-clockwise direction as shown in FIGS. 10(*b*), the engaging portion moves to the upper end of the linear groove portion from the curved groove portion, for example abutting against the curved portion 18*a* of the projection 18, so that while the pin 1 is moving upwardly, it is possible to be located to the linear groove portion 15*a* under the projection 18. Also, in this structure, for example, in the condition that the engaging portion 24 is located in the groove width widened in the cured groove portion 15*b*, when the pin 1 is moved upward by the cam operation of the cam projections 12, 22, explained later, the engaging portion 24 is induced by the curve of the curved groove portion 15*b*, so that it is possible to engage the linear groove portion 15*a* immediately under the projection 18. Incidentally, in FIGS. 9(*b*), 9(*c*), 10(*a*), 10(*b*), the leg pieces are widened, but are omitted.

Figure 4:
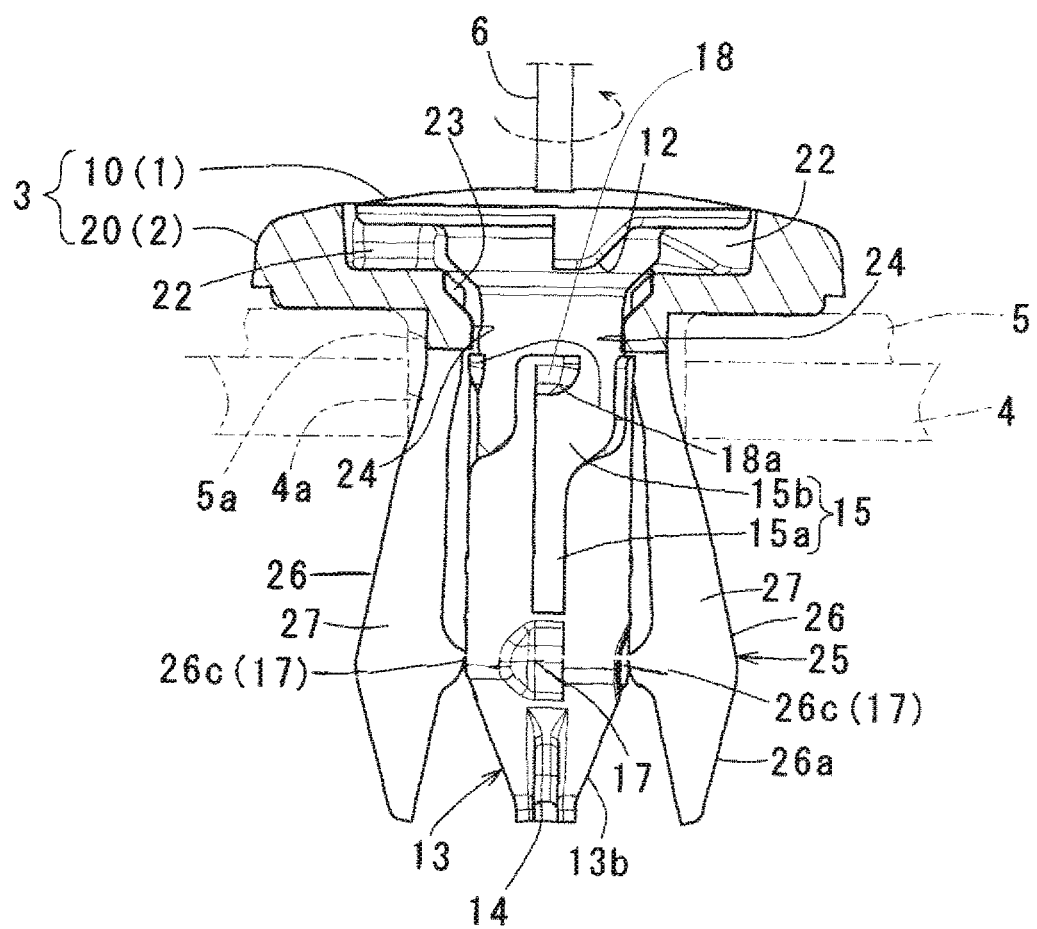
FIG. 4 is an explanatory view of sectioning the grommet in the pin permanent fixing condition.
Figure 5A:
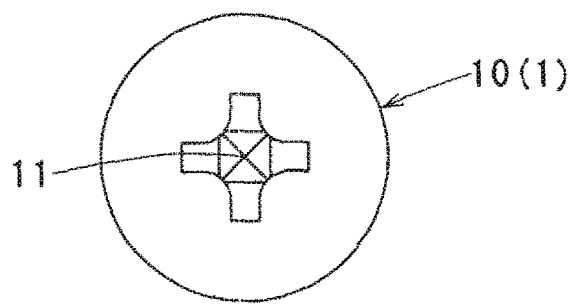
Figure 5B:
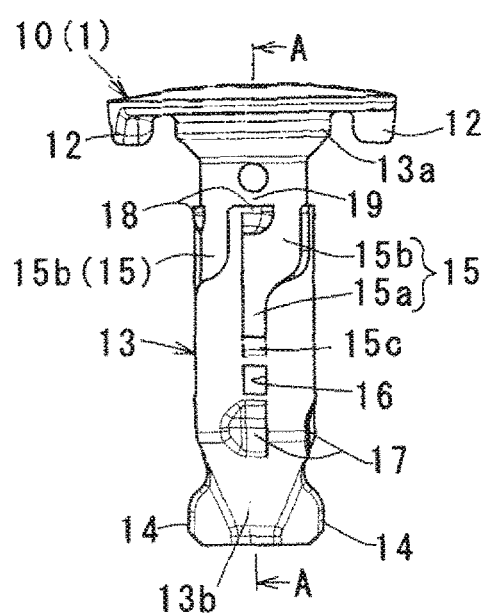
Figure 5D:
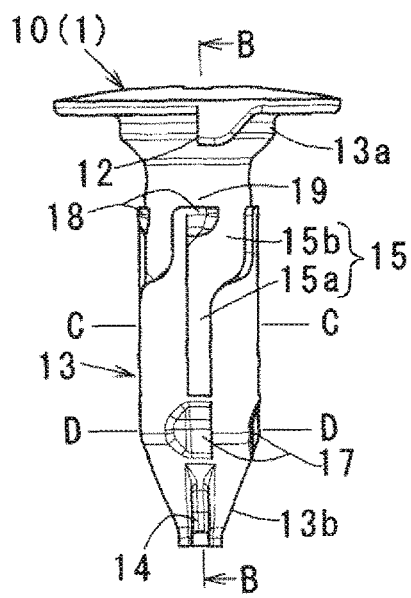
Figure 5C:
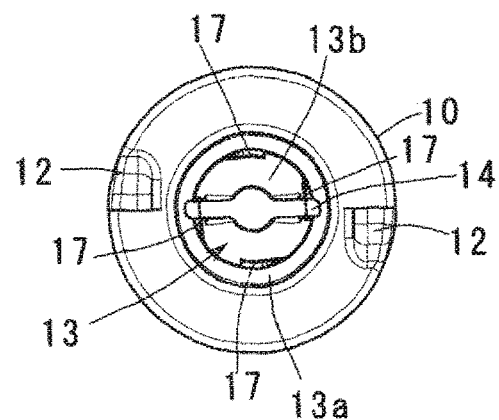
Figure 6A:
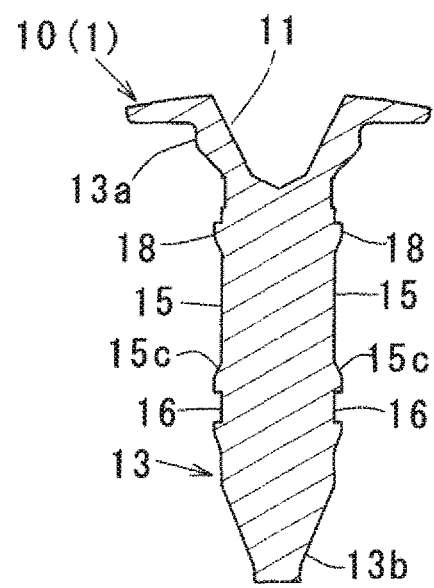
In FIG. 6, (a) is a cross-sectional view of A-A in FIG. 5(b)
FIG. 6(b) is a cross-sectional view of B-B in FIG. 5(d)
FIG. 6(c) is an enlarged cross-sectional view of C-C in FIG. 5(d)
FIG. 6(d) is an enlarged cross-sectional view of D-D in FIG. 5(d).
Figure 6B:
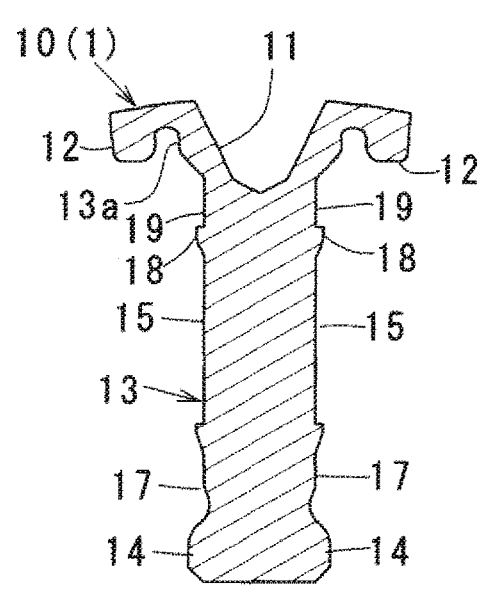
Figure 6C:
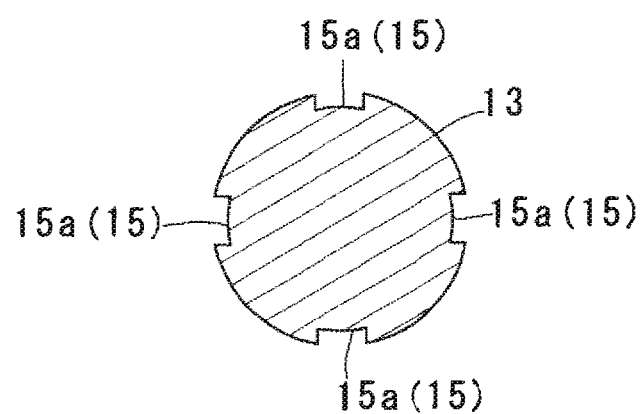
Figure 6D:
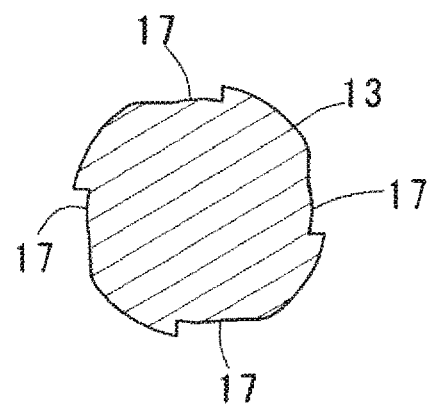

The step portions 17, as shown in FIG. 6(*d*), are provided around the shaft periphery in the circular shape, and are spaced slightly from the guide grooves 15 and are formed with a shallow reduce portion in about L-shape immediately under the guide grooves 15. The step portions 17, as shown in FIG. 4, keep the permanent fixing condition stably by engaging the leg side pressure projections 26*c* of the grommet 2 with a predetermined pressure in the permanent fixing condition, as explained later. Incidentally, the pressure projection 26*c* rides up onto the shaft periphery from the plan surface of the step portion with an elastic displacement when the permanent fixing condition where the engaging portion 24 engages the second engaged portion 19 is released for disengagement by rotating the pin 1. At that time, it provides the click feeling.

Projections 18 are formed at the upper ends of the linear groove portions 15*a* and are connected to the curved groove portions 15*b*. The projection 18 is plan at an upper surface, and a side surface at the curved groove portion 15*b* is formed to be an arc portion 18*a*. The arc portion 18*a* helps leading the engaging portion 24 to a side of the linear groove portion 15*a* while moving the pin 1 upwardly when contacting the engaging portion 24 by rotation of the pin 1.

The second engaged portion 19 is located at an extension line of the linear groove portion 15*a*, is connected to the curved groove portion 15*b* at a circumference direction, and is separated at upper and lower portions by the projection 18 and a tapered portion of the large diameter portion 13*a* at the head side. Also, when the pin 1 is inserted into the grommet 2, the engaging portion 24 is engageable with the second engaged portion 19 by riding over the projection 18 from the linear groove portion 15*a*.

On the other hand, the grommet 2 is an injection molded product made of resin, and, as shown in FIG. 1 to FIG. 8(*b*), includes a flange portion 20 with about a disc shape, and a leg portion 25 with about a cylindrical shape projecting from a lower center portion of the flange portion 20. The flange portion 20 comprises a concave portion 21 receiving the head portion 10, cam projections 22 provided on an inner bottom of the concave portion 21, an insertion hole 23 provided in the center of the inner bottom of the concave portion 21, the engaging portions 24 formed near the insertion hole 23, and ribs 20a formed to project under the bottom surface.

Figure 7A:
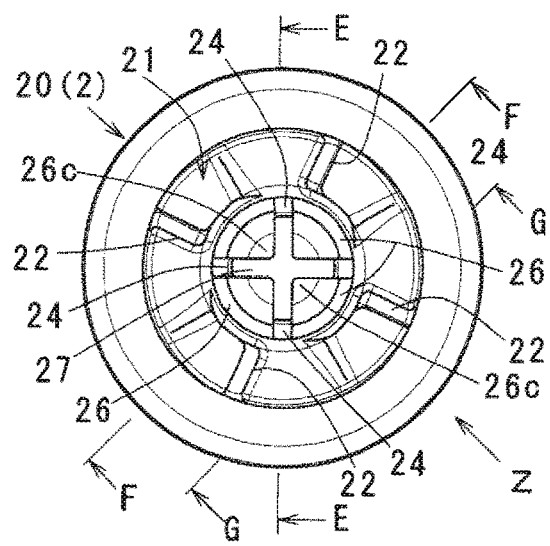
Figure 7B:
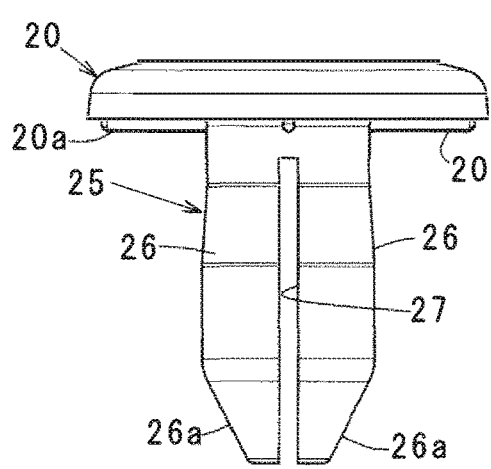
Figure 7D:
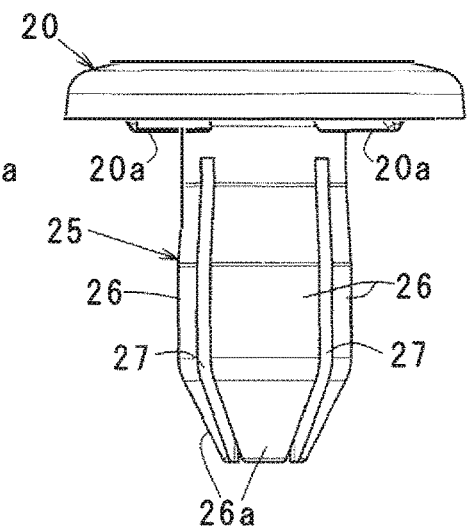
Figure 7C:
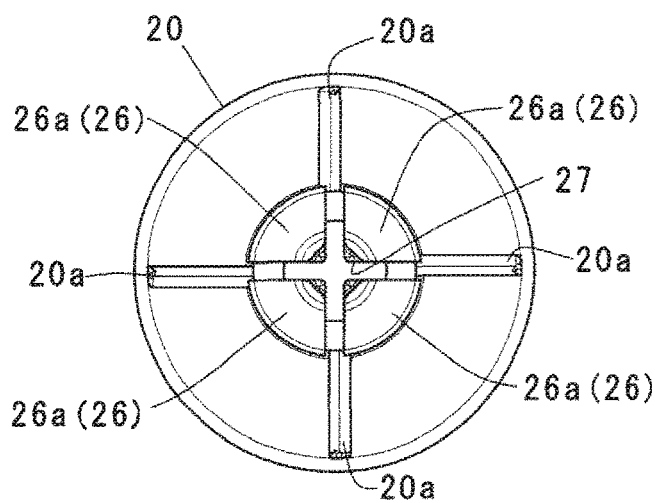
Figure 8A:
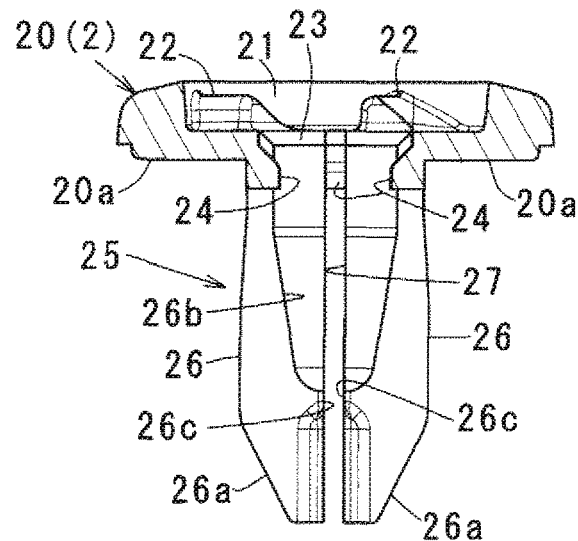
In FIG. 8, (a) is a cross-sectional view of E-E in FIG. 7(a), (b) is a cross-sectional view of F-F in FIGS. 7(a), and (c) is a cross-sectional view of G-G in FIG. 7(a).
Figure 8B:
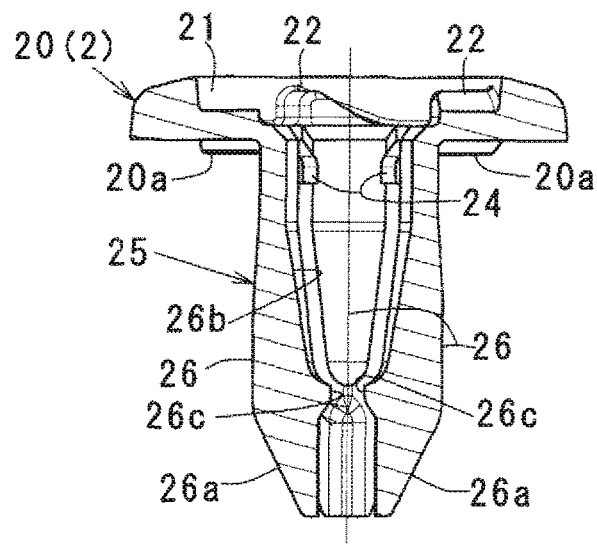
Figure 8C:
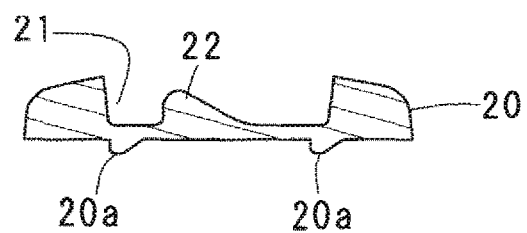

In these members, the cam projections 22 are located in the inner bottom face as shown in FIG. 7(a), and arranged plurally (four in this example) around the insertion hole 23. In each cam projection 22, as shown in FIGS. 8(a) to 8(c), in the peripheral direction, one end side is formed with an inclined face, and the other end side is formed vertically. In a cam operation, in a condition that the head portion 10 is received in the concave portion 21, the cam projection 12 at the head side is located in a lower portion between the cam projections 22 in the concave side, and when the pin 1 is rotated, the cam projection 12 moves along the cam projection 22 corresponding thereto, so that the pin 1 is raised upward to the height corresponding to the inclined surface.

The insertion hole 23 extends to the cylindrical inner side of the leg portion 25. The engaging portions 24 are formed at four positions equally dividing the hole periphery at the hole underside of the insertion hole 23, and are projections with a size freely movably engaging the guide groove 15 of the pin. Also, the projection of the engaging portion 24 is plane at a lower side, and is formed at an upper side to have an inclined face which becomes a larger diameter as it goes upward communicating with the insertion hole 23. This shape, as assumed from FIGS. 9(a) to 9(b), helps preventing accidental disengagement even if a force is applied to the pin upwardly in a condition that the engaging portion 24 engages the second engaged portion 19, engaging easily through the inclined surface when the engaging portion 24 engages the second engaged portion 19 riding over the projection 18 upon insertion of the pin 1, and accidentally releasing the engagement even if the pressure in the lower direction is applied to the pin in the permanent fixing condition.

Figure 2A:
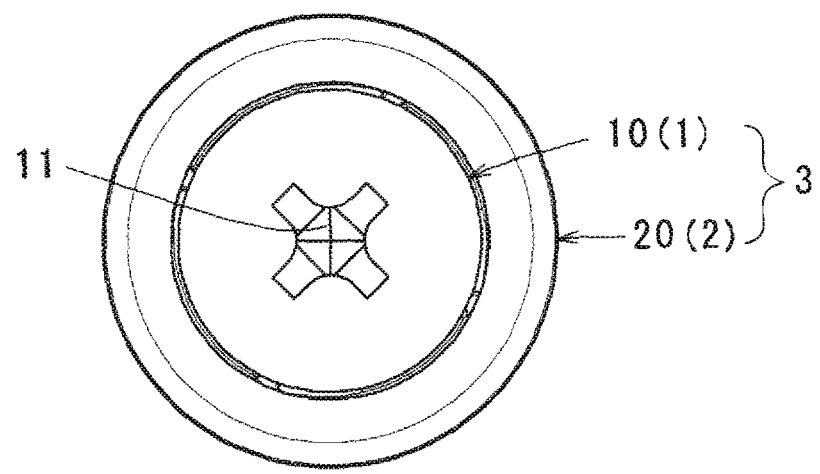
Figure 2B:
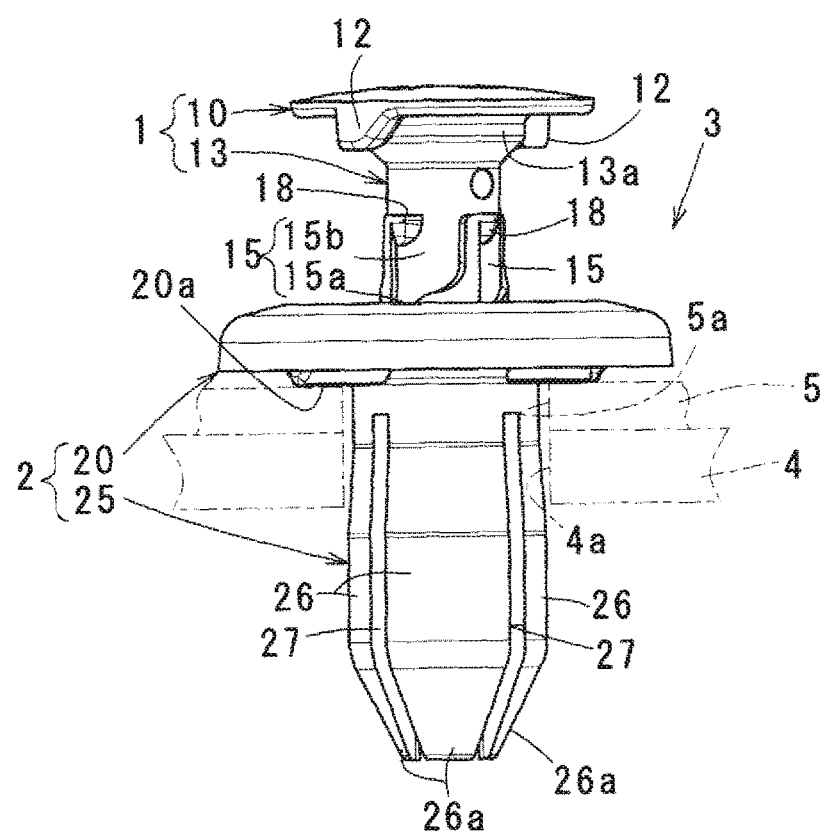
Figure 3A:
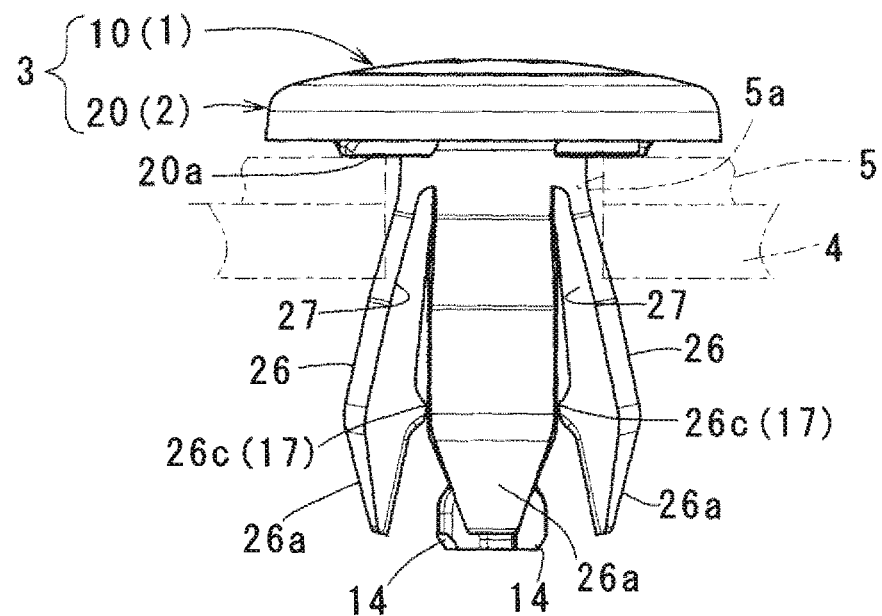
Figure 3B:
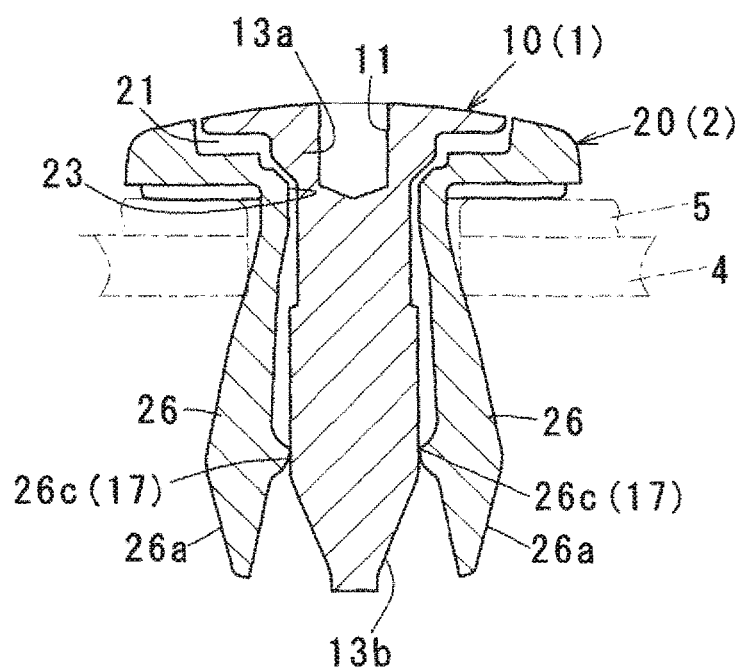

The ribs 20a (refer to FIG. 2(b)) are, under the lower surface of the flange portion, arranged in about a cross shape except for the center portion corresponding to the leg portion 25, and as supposed from FIG. 4, operate such that the flange portion 20 is stably retained on the side plate 5 at the attachment portion side in the using condition of the clip 3. Incidentally, as a modified example, the ribs 20a may be omitted, or the flange portion 20 may be retained through a seal portion relative to the side plate 5.

The leg portion 25 has about a cylindrical shape, and is divided into four leg pieces 26 by a cross shape slit 27. Each leg piece 26 can swing around a base thereof at a side of the flange 20 as a fulcrum, and is made gradually thin to easily insert an end portion 26a into attachment holes 4a, 4b. An inner side of each leg piece 26 has a largest diameter at a slightly lower portion of the insertion hole 23, a smallest diameter at a slightly lower side from a middle between upper and lower portions of the leg piece, and a slightly larger diameter, at a slightly lower side thereof, than the smallest diameter. Also, an inner face of each leg piece is formed with an inclined face 26b from the largest diameter portion to the smallest inner diameter portion, the smallest inner diameter portion is formed to be a pressure projection 26c pressure contacting the periphery of the shaft portion 13, and the lower side lower than the pressure projection 26c is formed in a vertical face. Incidentally, the engaging portion 24 is located at the upper end of the slit 27.

(Operation) Herein below, the main operation of the clip 3 is explained with reference to FIGS. 9(a) to 9(c) and 10(a) to 10(c).

Figure 9A:
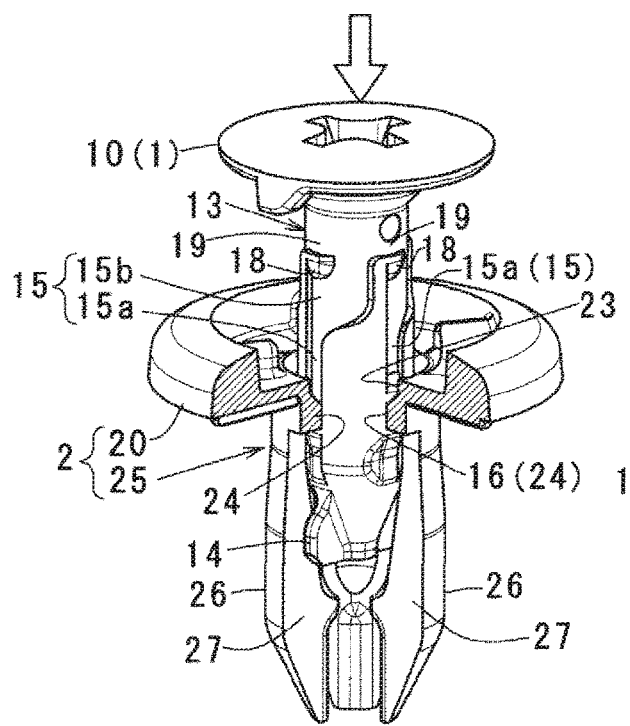
FIGS. 9(a) to 9(c) show an operation 1 of the clip, wherein Fi. 9(a) is an explanatory view showing a pin temporary fixing condition relative to the grommet.

(1) In the clip 3, in case the pin 1 and the grommet 2 are single products, it is difficult to handle. Therefore, the clip is generally handled or supplied to a using place in a temporary fixing condition where the pin 1 is pre-assembled with the grommet 2, as shown in FIG. 2(b) and FIG. 9(a). In a temporary fixing operation, for example, as shown in FIG. 1, the pin 1 is pushed down to the insertion hole 23 of the grommet 2 in a condition to match with the upper inclined faces of the projections which are the engaging portions for the respective wings 14. Then, the respective wings 14 enter the slit 27 of the leg portion while elastically deforming the engaging portions 24, and the shaft portion 13 enters the inner side of the respective leg pieces 26. Then, after the engaging portions 24 ride over from the step portions 17 to the shaft periphery, the engaging portions 24 engage the recess portions which are the first engaged portions 16 or the linear groove portions 15a of FIG. 5 (d) with a click feeling, to thereby become the temporary fixing condition.

Figure 9B:
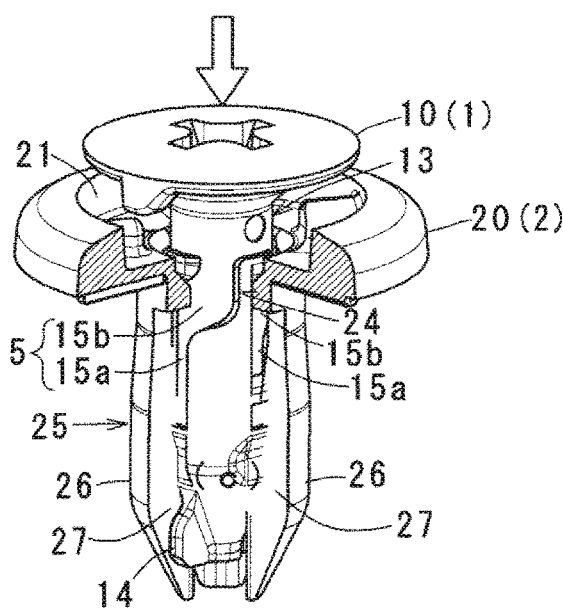
Figure 9C:
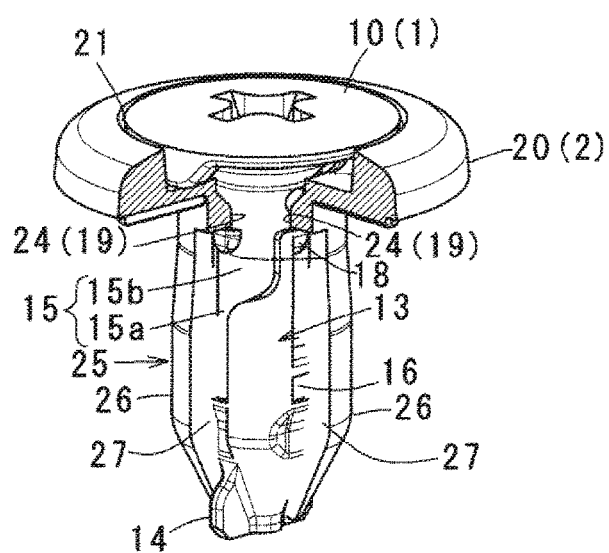

(2) FIGS. 9(a) to 9(c) show operations from the temporary fixing condition to the permanent fixing condition. In this structure, the pin 1 is in the temporary fixing condition, and the shaft portion 13 is further pushed into the leg portion 25. At that time, it is inserted along the guiding operation of the linear groove portions 15a of the guide grooves fitting the engaging portions 24, so that the engaging portions 24 are elastically engage-released from the depressions as the first engaged portions 16. Thereafter, the pin 1 is pushed linearly in the condition that the engaging portions 24 are fitted in the linear groove portions 15a, and after the projections 18 abut against the engaging portions 24, as shown in FIG. 9(b), when the pin 1 is further pushed, the engaging portions 24 ride over the projections 18 with the elastic deformation and engage the second engaged portions 19 to change to the permanent fixing condition.

Figure 10A:
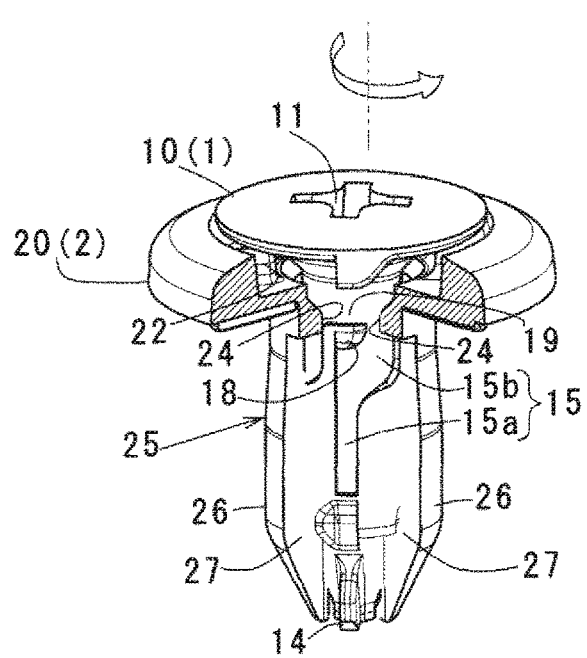
Figure 10B:
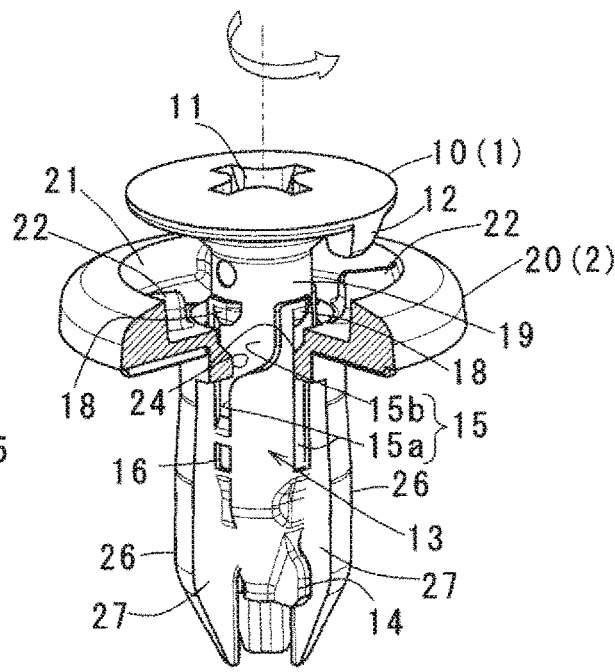
Figure 10C:
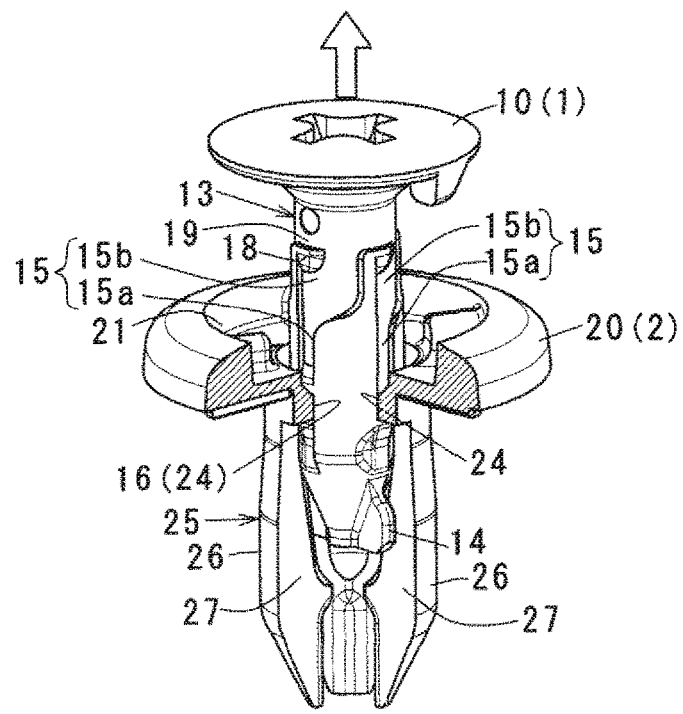
Figure 11A:
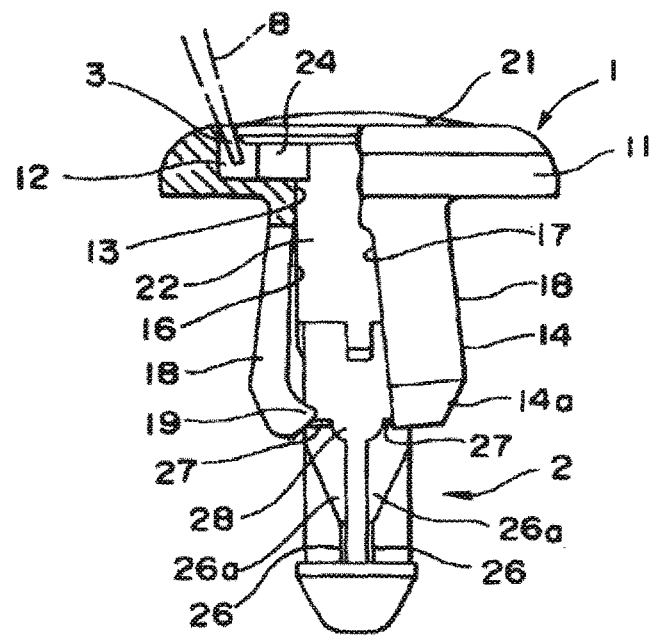
In FIG. 11, (a) shows a clip structure of the Patent Document 1.
FIG. 11(b) shows a clip structure of the Patent Document 2.
Figure 11B:
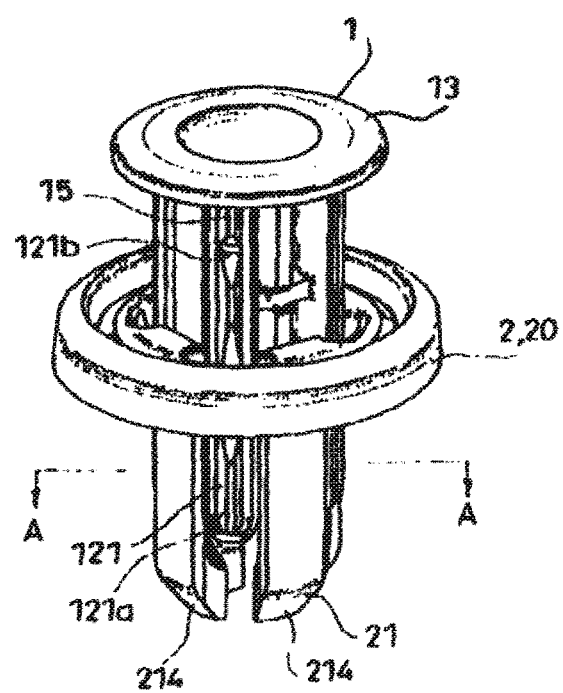

(3) FIGS. 10(a) to 10(c) show the operations from the permanent fixing condition as shown in FIG. 9(c) to again the temporary fixing condition. In the clip 3, the pin 1 includes the guide grooves 15 on the shaft portion 13 which can guide the linear movement and rotation of the pin in the condition such that the guide grooves 15 engage the engaging portions 24 at the grommet side. Therefore, when the pin 1 is rotated in the counter-clockwise direction for a predetermined angle by using a tool 6, such as a driver, engaging with an insertion portion 11, after engagement release as shown in FIG. 10(a) where the second engaged portions 19 moves relative to the engaging portions 24 in the peripheral direction, the pin moves for a predetermined length to the upper direction by the guiding operation of the guide grooves 15 relative to the engaging portions 24, as shown in FIG. 10(b). At this time, in this embodiment, the upper movement of the pin 1 works by the cam operation of the cam projections 12, 22. Thereafter, as shown in FIG. 10(c), when the head 10 of the pin is pulled by a tool or figure, not shown, along with the guide operation of the linear grooves 15a of the guide grooves fixing with the engaging portions 24, the pin 1 moves straight upward to thereby engage the engaging portions 24 with the first engaged portions 16 to return to the temporary fixing condition. Namely, the clip is returned to the initial temporary fixing condition, so that it is efficiently removed by itself or together with the side plate at the attachment side.

(4) In other words, in case the permanent fixing condition is changed to the temporary fixing condition, only by rotating operation of the pin 1 for the predetermined angle, after the second engaged portion 19 is engage-released from the engaging portion 24, the pin is automatically moved up for the predetermined distance along with the guiding operation of the guide groove 15 and the cam operation. Thus, in this structure, even in a narrow place or place where eye-observation is difficult, it is possible to quickly and surely change from the permanent fixing condition to the temporary fixing condition. By the way, as the clip 3 approaches from the permanent fixing condition to the temporary fixing condition, the leg portion 25 is made small to the original condition, so that the clip is likely to rotate relative to the attaching holes 4a, 4b. However, in the clip 3, by only rotating the pin 1 for the predetermined angle (in the example 90 degrees), the pin 1 is pulled up for the predetermined distance to be able to grab the head portion 10 above the flange 20 and projected due to the cam operation of the guide groove 15 and the above cam operation, so that the above undesirable condition is eliminated.

(5) Also, in the above clip 3, for example, as compared with the clip of the Patent Document 1, the engaging portion 25 of the grommet side engaging with and disengaging from the engaged portions 16, 19 of the pin 1 is not formed on the leg portion, as in the Patent Document 1, and is formed near the inner periphery of the insertion hole 23 of the flange portion 20. Thus, since the enlarged amount of the leg portion 25, i.e. enlarged diameter of the leg pieces 26 is made large when the pin 1 is inserted all the way to the end, the tolerance relative to the plate thicknesses of the plates 4, 5 and the hole diameters of the attachment holes 4a, 5a is large and is excellent for versatility.

As explained above, the clip of the invention is sufficient to include the structure specified in the claims, and the detailed structure may be changed and developed with reference to the embodiments. As an example, the leg portion shows an example having four divided leg pieces, but it may have a structure more than two leg pieces. Similarly, the engaging portions and the engaged portions are four pairs, but two or three pairs may have no problem. Also, depending on the clip, a structure with four engaged portions and two engaging portions may be preferable. The cam projection is to move the pin upwardly by the mutual cam operation by the rotation of the pin relative to the grommet, but it may be omitted. In that case, when the pin of the invention is rotated, after the second engaged portion is engage-released from the engaging portion, the pin readily moves upward, as explained before, along with the guiding operation of the projections and the curved groove portions.

EXPLANATION OF NUMERALS

1: Pin
2: Grommet
3: Clip
4: Main body side plate portion (4a: attachment hole)
5: Attachment side plate portion (5a: attachment hole)
6: Tool, such as a driver
10: Head portion (11: insertion groove)
13: Shaft portion (13b: inclined portion at an end side)
15 Guide groove (15a: linear groove portion, 15b: curved groove portion)
16: First engaged portion
17: Step portion
18: Projection
19: Second engaged portion
20: Flange
25: Leg portion (26: leg piece, 27: slit)
26c: Pressure projection The entire contents of the specification, claims, drawings and abstract of Japanese Patent Application No. 2018-155270 filed on Aug. 22, 2018 are cited herein and are incorporated as the disclosure of the specification of the invention.

What is claimed is:

1. A clip comprising:
a pin including a head portion and a shaft portion provided under the head portion, a first engaged portion and a second engaged portion both being provided on the shaft portion; and
a grommet having a flange with an insertion hole, a leg portion projecting from a lower surface of the flange and an engaging portion engaging with and disengaging from the respective engaged portions, the clip changing a temporary fixing condition where the engaging portion engages the first engaged portion in a course of arranging the pin to the grommet such that the shaft portion is inserted into the leg portion through the insertion hole, to a permanent fixing condition where the engaging portion is engaged with the second engaged portion after the leg portion is elastically enlarged by further insertion of the shaft portion,
wherein the grommet includes the engaging portion around an inner periphery of the insertion hole of the flange,
the pin includes a guide groove having a linear groove portion between the first engaged portion of the shaft portion and the second engaged portion and a curved groove portion in a curved shape provided along an upper side of the linear groove portion, the guide groove guiding movement of the pin in a condition of slidably engaging the engaging portion, and a projection formed at an upper end of the linear groove portion as the second engaged portion, and
when the pin where the engaging portion is in the temporary fixing condition is pushed, the engaging portion slides and rides over the projection and the pin comes to the permanent fixing condition, and when the pin is rotated such that the engaging portion disengages from the projection and enters the portion, the pin moves upwardly and the engaging portion contacts the curved groove portion so that the pin changes from the permanent fixing condition, and the engaging portion is able to engage the first engaged portion.

2. The clip according to claim 1, wherein the first engaged portion and the projection of the second engaged portion are formed to correspond to two ends of the linear groove portion in a longitudinal direction.

3. The clip according to claim 1, wherein engagement of the engaging portion with the projection is released when the pin is rotated for a predetermined angle by a removing operation from the permanent fixing condition of the pin to the grommet, and when the pin is further rotated for a predetermined angle in a peripheral direction, the pin is pulled up for a predetermined length.

4. The clip according to claim 1, wherein the curved groove portion is provided to extend from an upper side groove portion of the linear groove portion, which has a width corresponding to a groove width of the curve groove portion, so that when the pin disengages from the projection, the engaging portion moves to the upper side groove portion of the linear groove portion with the width widened above the curved groove portion.

5. The clip according to claim 1, wherein the linear groove portion extends along an axial direction of the shaft portion, and the curved groove portion is continuous to the upper side of the linear groove portion.

6. The clip according to claim 5, wherein the second engaged portion is connected to the curved groove portion, and by rotating the pin in a condition of engaging with the projection, the engaging portion moves to the curved groove portion to be able to release engagement.

7. The clip according to claim 5, wherein the first engaged portion is formed as a concaved portion provided at a lower end of the linear groove portion or at the lower end with a space therebetween.

8. The clip according to claim 1, wherein the pin further includes an inclined portion at a lower end of the linear groove portion, and a depression as the first engaged portion located at a side opposite to the linear groove portion relative to the inclined portion.

9. The clip according to claim 8, wherein the pin further includes a step portion at a lower side relative to the depression, the step portion engaging a leg side pressure projection of the grommet.

\* \* \* \* \*